United States Patent Office 3,839,378
Patented Oct. 1, 1974

3,839,378
PROCESS FOR PREPARING CARBOXYLIC ACID OR ESTER THEREOF
Mitsuo Yamaguchi and Kazuo Tano, Tokyo, Japan, assignors to Mitsubishi Chemical Industries, Ltd., Tokyo, Japan
No Drawing. Filed May 18, 1971, Ser. No. 144,637
Claims priority, application Japan, May 19, 1970, 45/42,586
Int. Cl. C08h 17/36
U.S. Cl. 260—413
8 Claims

ABSTRACT OF THE DISCLOSURE

A carboxylic acid or ester thereof is prepared by reacting an olefinic unsaturated compound and carbon monoxide with water, alcohol, phenol or mixture thereof, in the presence of hydrogen gas and a catalyst having the general formula:

$$L_mPdX_n$$

wherein L represents a neutral ligand; X represents iodine or bromine; and $m$ and $n$ represent integers, respectively.

BACKGROUND OF THE INVENTION

Field of the Invention

This invention relates to a process for preparing a carboxylic acid or ester thereof. More particularly, this invention relates to an improved process for preparing a carboxylic acid or ester thereof, by reacting an olefinic unsaturated compound and carbon monoxide with water, an alcohol or phenol or mixture thereof.

Description of the Prior Art

It has been known that a carboxylic acid or esters thereof may be prepared by reacting an olefinic unsaturated compound and carbon monoxide with water, alcohol or phenol, in the presence of a catalyst having the general formula:

$$L_mPdX_n$$

wherein L represents an organic phosphine, phosphite, ammonia, amine, nitrile or unsaturated hydrocarbon; X represents an acid residue; $m$ represents an integer of from 1 to 4; and $n$ represents an integer of from 1 to 2, and $m+n$ is an integer of from 2 to 6. (Japanese Patent Publication 21722/1968.) However, when this catalyst was used alone, it was difficult to obtain sufficient catalytic activity in an industrial scale operation. Accordingly, a hydrogen halide has usually been added as a reaction activity accelerant. This expedient has not proven entirely satisfactory, since the hydrogen halides are highly corrosive and can be damaging to the reactor equipment. Corrosion is especially severe if the carboxylic acid is prepared in the presence of a large quantity of water. In order to prevent such corrosion, it has been the practice to line the internal walls of the reactor and a part of the distillation apparatus with expensive hydrogen halide resistant material, but this has severely added to the process costs.

It has also been known that the catalytic activity will be relatively high if the acid residue X of the formula $L_mPdX_n$ is a chloride residue. However, when X is a chloride residue, decomposition of the catalyst often occurs and metallic Pd is formed if hydrogen is present in the reactor system. In order to avoid this result, either a pure form of carbon monoxide, or a mixture of carbon monoxide and an inert gas has been used to preserve the catalyst. This meant that water gas, which is relatively cheap, could not be used in the process and therefore, the costs of conducting this process on an industrial scale were further increased.

SUMMARY OF THE INVENTION

Accordingly, it is one object of this invention to provide a process for preparing a carboxylic acid or ester thereof, using a catalyst system characterized by high catalytic activity, whereby corrosion of the reactor equipment is avoided, and wherein the reaction can be conducted in the presence of hydrogen.

It is another object of this invention to provide a process for preparing a carboxylic acid or ester thereof, by reacting an olefinic unsaturated compound, carbon monoxide and water, alcohol or phenol, wherein said reaction is accomplished economically, on an industrial scale.

These and other objects have now herein been attained by reacting an olefinic unsaturated compound, carbon monoxide and water, alcohol or phenol or mixtures thereof, in the presence of hydrogen, using a catalyst having the general formula:

$$L_mPdX_n$$

wherein L represents a neutral ligand; X represents iodine or bromine; and $m$ represents an integer of from 1 to 4, $n$ represents an integer of from 1 to 2, and $m+n$ is an integer of from 2 to 6.

Although this compound is not catalytically active in its original form, it can be added to the reaction system and activated in situ. Unlike the prior art catalyst systems, when used in the presence of hydrogen, the catalyst of the present invention (wherein X=I or Br) will demonstrate higher levels of activity, as compared with the prior art catalyst (wherein X=Cl). On the other hand, the activity of the catalyst when X=Cl is greater than that of the present invention if the reaction is conducted in the absence of hydrogen. From these observations, it has been theorized that the activated form of the present catalyst, in the presence of hydrogen, is different from the activated form when used in the absence of hydrogen.

The activated form of the catalyst of the present invention, in the presence of hydrogen, has a desirably high catalytic activity, even without the use of a hydrogen halide, and the extent of side reactions, such as halogenation of olefin is substantially reduced or completely depressed. Moreover, it has been observed that even with the presence of hydrogen, serious hydrogenation of the olefin is not obtained. It can therefore be said that the catalyst of the present invention demonstrates a high degree of selectivity toward the formation of carboxylic acids or esters. The catalyst of the present invention is quite stable, even following the reaction, as compared with the relatively poor stability of the homologous catalyst, wherein X=Cl. Hydrogen can be easily and economically supplied together with the carbon monoxide in the form of water gas, and hence the process can be conducted economically on an industrially acceptable scale.

DETAILED DESCRIPTION OF PREFERRED EMBODIMENTS

Suitable olefinic unsaturated hydrocarbons used in the process of this invention are those compounds having one or more olefinic double bonds. Exemplary olefinic unsaturated hydrocarbons are the aliphatic and alcyclic hydrocarbons, having 2–20 carbon atoms and 1–4 olefinic double bonds. The olefinic unsaturated hydrocarbons used in this process may have a conjugated triple bond with the double bond or may have an aromatic ring. They may have such inert substituent groups as a carboxyl group, an ester group, an acid amide group, a nitrile group, a halogen, a hydroxyl group, an alkoxy group, etc.

However, when the olefinic unsaturated compound has a hydroxyl group, i.e., an olefin alcohol, the carboxylic acid resulting from the present process is usually converted into the corresponding ester.

Suitable results have been obtained when using such olefinic unsaturated compounds as ethylene, propylene, isobutene, butene-1, hexene-1, octene-1, dodecene-1, 2-ethylhexene-1, cyclohexene, cyclooctene, butadiene-1,3, isoprene, cyclooctadiene, ethyl acrylate, acrylamide, allyl alcohol, vinyl chloride, styrene, etc. Where water is used in the reaction, a carboxylic acid will be produced. On the other hand, where an alcohol or phenol is used, the corresponding carboxylic acid ester is produced. Where a mixture of water and an alcohol, or a mixture of water and a phenol is used, a mixture of a carboxylic acid and the corresponding carboxylic acid ester is produced. The alcohol used for this invention can be an aliphatic, alicyclic or aromatic alcohol, or an alcohol having such inert substituent groups as a carboxyl group, ester group, acid amide group, halogen, hydroxyl group, or alkoxy group. Also, it is possible to use a polyhydric alcohol.

The phenol used for this invention can be an aromatic compound having one or more phenolic hydroxyl groups. Typical examples of said alcohols and phenols include methanol, ethanol, propanol, isobutyl alcohol, cyclohexanol, benzyl alcohol, ethylene glycol, phenol, o-cresol and α-naphthol.

An amount of water, alcohol or phenol used in this process should be not less than one equivalent, and preferably more than one mole, especially 2–10 moles per equivalent of olefinic double bonds. The reaction of this invention can be conducted in the presence of hydrogen gas, and accordingly, water gas can be used as the carbon monoxide source. Of course, mixtures of carbon monoxide and hydrogen gas can be used. An inert gas, such as nitrogen, may also be present. Suitably, hydrogen gas may be present in the range of 0.001–10, preferably 0.02–2.0 molar ratio hydrogen to carbon monoxide. The total reaction pressure can be in the range of about 5–1,000 atms., and preferably 50–500 atms. The partial pressure of the carbon monoxide is preferably in the range of about 10–300 atms.

As indicated above, the catalyst used in this invention has the general formula:

$$L_mPdX_n$$

wherein X represents iodine or bromine; L represents a neutral ligand such as an aryl or alkyl substituted phosphine, arsine, phosphite, or stibine; an organic nitrogen containing compound, e.g., amine, pyridine, piperidine, phenanthroline, pyrrolidone or dipyridyl; a nitrile compound; an unsaturated hydrocarbon; or ammonia; $m$ represents an integer of from 1 to 4, $n$ represents an integer of from 1 to 2, and $m+n$ is an integer of from 2 to 6. Especially good results have been obtained using catalysts having the formula: $PdI_2[P(C_6H_5)_3]_2$ and $PdBr_2[P(C_6H_5)_3]_2$.

The catalyst can be dissolved or solvated in a solvent such as chloroform, although this is optional.

Good results are obtainable when the catalyst is used in amounts of $10^{-4}$–1 by weight percent based on the total weight of the reactant mixture.

Suitable reaction temperatures range from about 50°–150° C.

Although the use of a hydrogen halide is not required, where corrosion of reactor equipment is not a problem, such as if no water is used, it is possible to add hydrogen halide as a reaction accelerant with good results.

In order to maintain the stability of the catalyst in the reaction, an excess amount of a compound having a neutral ligand, such as a phosphine, phosphite, halide, or halogen, may be added, thereby permitting the reaction to be carried out at higher temperatures. The process of this invention, however, can be conducted quite successfully, even without such a stabilizer.

In general, it is not necessary to use a solvent in the reaction. If an alcohol is used as one of the reactants, all of the raw materials can be uniformly mixed without any solvent. However, where water is used, it is rather desirable from the viewpoint of reaction velocity and catalyst stability, to add a hydrophilic polar organic solvent, to provide a more uniform reaction.

The particular solvent to be used, when one is desired, will depend upon the particular olefinic unsaturated compound and particular catalyst used for said reaction. Suitable solvents include the ketones, such as acetone, methyl ethyl ketone and methyl isobutyl ketone; ethers, such as ethyl ether, tetrahydrofuran, and dioxane; sulfoxide, such as dimethyl sulfoxide; and organic carboxylic acids, such as acetic acid, propionic acid and butyric acid.

Where a continuous reactor type operation is employed, it is not necessary to add any solvent, because the resultant carboxylic acid or ester will possess sufficient solvent action.

Having generally described the invention, a further understanding can be obtained by reference to certain specific examples which are provided herein for purposes of illustration only and are not intended to be limiting in any manner unless other wise specified.

EXAMPLE 1

15 ml. of hexene-1, 3 ml. of water, 42 ml. of acetone and 162 mg. of $PdI_2[P(C_6H_3)_3]_2 \cdot CHCl_3$ were charged to a 200 ml. autoclave having an internal lining of titanium and equipped with a stirrer. The autoclave was closed and the air was evacuated by charging CO gas to a pressure of 30 kg./cm.$^2$G, 3 times. The autoclave was then filled with 100 kg./cm.$^2$ of CO under pressure at room temperature. 100 kg./cm.$^2$ of hydrogen was further charged to the autoclave under pressure to provide 200 kg./cm.$^2$ of total pressure. The autoclave was heated to 110° C. and maintained at the temperature for 70 minutes, while stirring. Following the reaction, the autoclave was cooled and the reaction products were analyzed by gas chromatography and acidimetry. It was confirmed that a carboxylic acid having 7 carbon atoms resulted in 99% yield based on the hexene-1. It was found that no catalyst was reduced to Pd metal.

EXAMPLES 2–6

The process of Example 1 was repeated except varying the amount of hydrogen gas. The results of the reaction are shown in Table 1, wherein the specific reaction velocity was calculated by dividing the period required for 50% of conversion in the absence of hydrogen by the period required for 50% of conversion in the presence of hydrogen, under measurement from each gas absorption curve.

TABLE 1

| Example | 1 | 2 | 3 | 4 | 5 | 6 |
|---|---|---|---|---|---|---|
| CO pressure (kg./cm.$^2$) | 100 | 100 | 100 | 100 | 100 | 100 |
| H$_2$ pressure (kg./cm.$^2$) | 100 | 0 | 0.5 | 2 | 11 | 27 |
| Reaction period (minutes) | 70 | 210 | 200 | 180 | 130 | 100 |
| Specific reaction velocity | 15 | 1 | 1.3 | 4 | 6 | 8 |
| Yield of carboxylic acid (percent) | 99 | 90 | 93 | 98 | 99 | 98 |

EXAMPLES 7–8

The process of Example 1 was repeated, except using 135 mg. of catalyst of $PdBr_2[P(C_6H_5)_3]_2$ in the presence of hydrogen and in the absence of hydrogen.

The results are shown in Table 2.

TABLE 2

| | 7 | 8 |
|---|---|---|
| CO pressure (kg./cm.$^2$) | 100 | 100 |
| H$_2$ pressure (kg./cm.$^2$) | 0 | 100 |
| Reaction period (minutes) | 150 | 120 |
| Specific reaction velocity | 1 | 1.6 |
| Yield of carboxylic acid (percent) | 96 | 97 |

EXAMPLE 9

The process of Example 1 was repeated, except using ethanol to replace water and acetone. The reaction was conducted for 160 minutes. An ethyl ester of carboxylic acid having 7 carbon atoms resulted, at 95% of yield. It was also observed that an 84% yield was obtained in the absence of hydrogen, but with 100 kg./cm.² of CO for 260 minutes. The reaction velocity of the latter process was about ¼ of that of the former process.

REFERENCE 1

For comparison, the same type of experiment was conducted except using a palladium complex catalyst having a chloride residium. The process of Example 1 was repeated, with 120 mg. of $PdCl_2[P(C_6H_5)_3]_2$ without hydrogen, for 200 minutes. The yield of carboxylic acid was 86%.

The process of Example 1 was repeated, except using said catalyst and reacting in the presence of 0.5 kg./cm.² of hydrogen gas for 200 minutes. The yield of carboxylic acid was decreased to 75%.

The ratio of the reaction velocity of the latter process using hydrogen gas to that of the former process using no hydrogen gas (specific reaction velocity) was 0.9. Further, when the experiment was conducted in the presence of 2 kg./cm.² of hydrogen gas, the yield of carboxylic acid was decreased to 54% and the specific reaction velocity was decreased to 0.6. It was found that Pd metal was separated in the latter processes using hydrogen gas.

REFERENCE 2

As further comparison, the same type of experiment was conducted for preparation of an ester of carboxylic acid.

The process of Example 9 was repeated, except using 120 mg. of $PdCl_2[P(C_6H_5)_3]_2$. The reaction was conducted without hydrogen for 200 minutes. The yield of carboxylic acid ester was 81%.

The process of Example 9 was repeated, except using said catalyst and reacting in the presence of 2 kg./cm.² of hydrogen gas for 200 minutes. The yield of carboxylic acid ester was decreased to 60%. The ratio of the reaction velocity of the latter process to that of the former process (specific reaction velocity) was 0.45.

EXAMPLE 10

The process of Example 1 was repeated except using octene-1 instead of hexene-1. The yield of carboxylic acid was 97%. The same process was repeated, except in the absence of hydrogen, for 180 minutes. The yield of carboxylic acid was decreased to 89%. The specific reaction velocity of the process using hydrogen was 9.

EXAMPLE 11

The process of Example 10 was repeated, except using a solvent mixture of acetic acid and nonanoic acid instead of acetone. The reaction was conducted for 120 minutes. The yield of carboxylic acid was 94%.

The same process was repeated except the reaction was conducted without hydrogen, for 220 minutes. The yield of carboxylic acid was decreased to 89%. The specific reaction velocity of the process using hydrogen was 6.

Having now fully described the invention, it will be understood that many changes and modifications can be made thereto without departing from the spirit or scope of the invention.

Accordingly, what is claimed as new and intended to be secured by Letters Patent is:

1. A process for preparing a carboxylic acid or ester thereof which comprises reacting, at a temperature of 50–150° C., an olefinic unsaturated compound and carbon monoxide with water, alcohol, phenol or mixture thereof, in the presence of hydrogen gas in an amount of 0.02 10 molar ratio hydrogen to carbon monoxide and a catalyst having the general formula:

$$L_mPdX_n$$

wherein L represents a neutral ligand selected from the group consisting of aryl or aryl and alkyl substituted phosphines, arsines, phosphites, and stibines; amines, pyridenes, piperidines, phenanthrolines, pyrrolidones and dipyridyls; nitriles, unsaturated hydrocarbons and ammonia. X represents iodine or bromine; and m represents an integer of from 1 to 4, n represents an integer of from 1 to 2, and m+n is an integer of from 2 to 6.

2. The process of Claim 1, wherein said olefinic unsaturated compound is an olefinic unsaturated hydrocarbon having 2–20 carbon atoms and 1–4 of olefinic double bonds.

3. The process of Claim 1, wherein the amount of said water, alcohol, or phenol is not less than one equivalent per equivalent of olefinic double bond.

4. The process of Claim 1, wherein the amount of hydrogen gas is in the range of 0.02–2.0 molar ratio hydrogen to carbon monoxide.

5. The process of Claim 1, wherein the catalyst is selected from the group consisting of $PdI_2[P(C_6H_5)_3]_2$ and $PdBr_2[P(C_6H_5)_3]_2$.

6. The process of Claim 1, wherein a hydrophilic organic polar solvent selected from the group consisting of ketones, ethers, organic carboxylic acids and sulfoxides is used as a reaction solvent.

7. The process of Claim 6, wherein said solvent contains at least one member selected from the group consisting of acetone, methyl ethyl ketone, methyl isobutyl ketone, ethyl ether, tetrahydrofuran, dioxane, acetic acid, propionic acid, butyric acid, nonanoic acid and dimethyl sulfoxide.

8. The process of Claim 2, wherein said olefinic unsaturated compound is selected from the group consisting of aliphatic and alicyclic hydrocarbons, having 2–20 carbon atoms and 1 to 4 olefinic double bonds.

References Cited

UNITED STATES PATENTS 3,168,553  2/1965  Slaugh _____ 260—413 X
3,437,676  4/1969  Kutepow et al. _____ 260—413 X
3,530,155  9/1970  Fenton _____ 260—413

ELBERT L. ROBERTS, Primary Examiner

E. G. LOVE, Assistant Examiner

U.S. Cl. X.R.

260—410, 485 R, 497 A, 497 R, 533 A, 534, 539